No. 834,462. PATENTED OCT. 30, 1906.
J. E. FAUGHT.
FURNITURE FASTENER.
APPLICATION FILED NOV. 29, 1905.
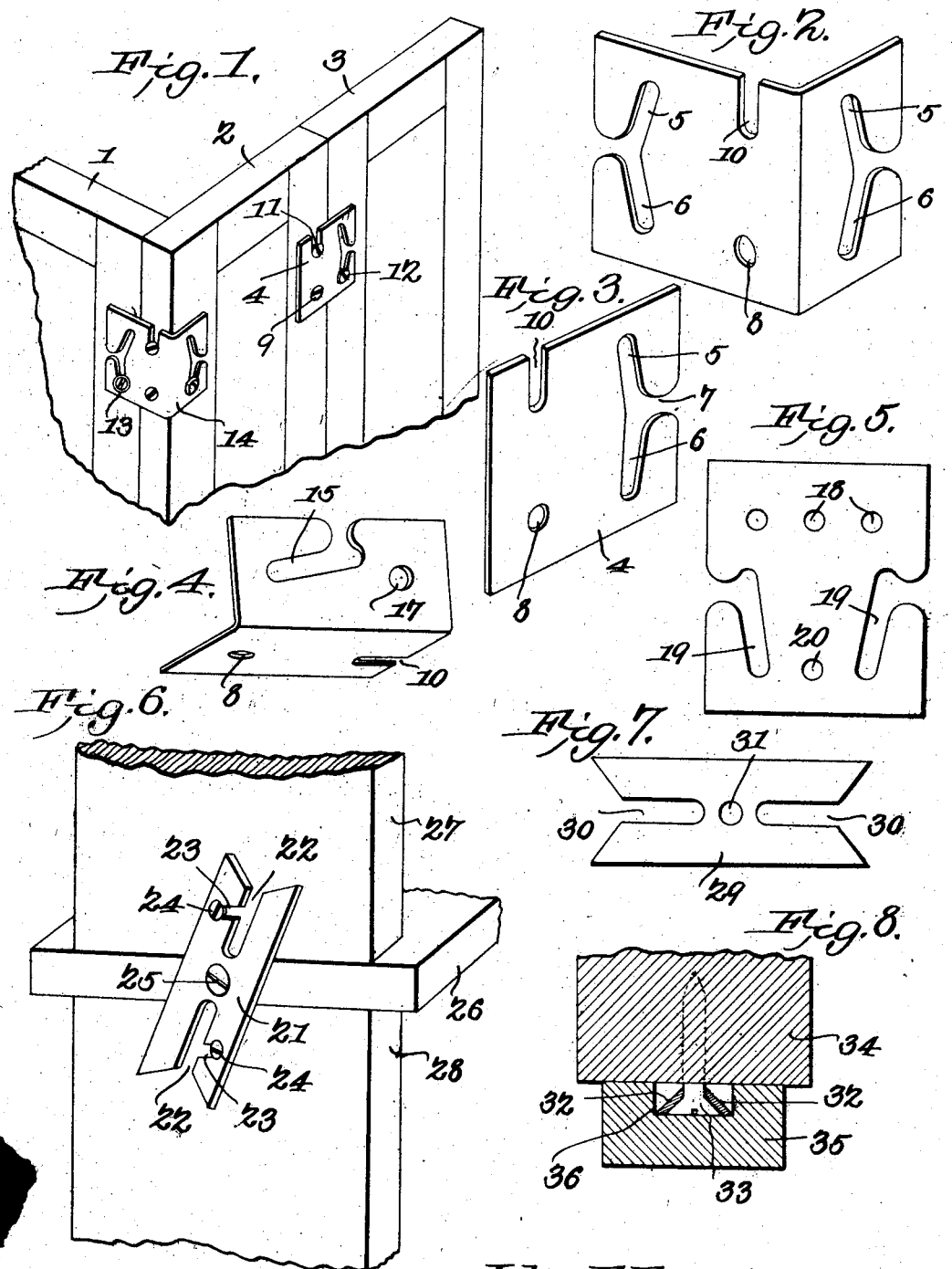
WITNESSES: John E. Faught, INVENTOR,
By C. A. Snow & Co.
ATTORNEYS.

UNITED STATES PATENT OFFICE.

JOHN E. FAUGHT, OF COLUMBIA CITY, INDIANA, ASSIGNOR OF ONE-HALF TO OLIVER H. DIFFENDARFER, OF COLUMBIA CITY, INDIANA.

FURNITURE-FASTENER.

No. 834,462.

Specification of Letters Patent.

Patented Oct. 30, 1906.

Application filed November 29, 1905. Serial No. 289,639.

*To all whom it may concern:*

Be it known that I, JOHN E. FAUGHT, a citizen of the United States, residing at Columbia City, in the county of Whitley and State of Indiana, have invented a new and useful Furniture-Fastener, of which the following is a specification.

This invention relates to furniture-fasteners.

The object of the invention is to provide a fastener adapted for securing together articles of furniture or other objects that are designed to be separated and assembled at will which in operation will operate positively to draw the objects or articles together, thereby to effect a close and stable joint.

A further object is to facilitate the removal of the fastener from the object to which it is secured by constructing the same in such manner that the removal of one of the fastening devices is all that will be necessary to free the fastener from the article to which it is attached.

With the above and other objects in view, as will appear as the nature of the invention is better understood, the same consists in the novel construction and combination of parts of a furniture-fastener, as will be hereinafter fully described and claimed.

In the accompanying drawings, forming a part of this specification, and in which like characters of reference indicate corresponding parts, Figure 1 is a view in perspective, exhibiting a portion of a piece of furniture composed of sections connected by two forms of fasteners embodied in the present invention. Fig. 2 is a perspective detail view of the form of fastener shown at the left-hand side of Fig. 1. Fig. 3 is a similar view of the form of fastener shown at the center of Fig. 1. Fig. 4 is a perspective detail view of the form of fastener shown in Fig. 3 bent to adapt it to be secured to the corner of an object. Fig. 5 is a view in elevation of a modified form of the invention. Fig. 6 is a perspective detail view showing still another form of the invention. Fig. 7 is a view in elevation of another form of the invention. Fig. 8 is a sectional detail view showing the manner in which the form of invention shown in Fig. 7 may be employed in securing together two objects where the joint is to be invisible. Fig. 9 is a view in elevation of another modified form of the invention.

Referring to the drawings and to Figs. 1 to 4 thereof, 1, 2, and 3 designate three sections of a piece of furniture that are to be connected, the section 1 being disposed at right angles to the sections 2 and 3. The sections 2 and 3 are connected by a fastener 4, (shown in detail in Fig. 3,) the said fastener consisting of a plate of metal provided near one edge with two obliquely-disposed locking-slots 5 and 6, that merge into an entering-slot 7. It will be noted that the slots 5 and 7 are oppositely disposed relatively to each other, and this arrangement adapts the fastener for use either upon the right or left hand side of a piece of furniture, thereby obviating the necessity of having the fasteners made rights and lefts. The fastener is provided with an orifice 8 to receive a screw 9 and with a slot 10 to receive a screw 11, the object for employing the slot 10 being to facilitate the removal of the fastener from the object to which it is secured, it being seen that by removing the screw 9 and loosening the screw 11 the fastener may be removed.

One of the slots 6 is adapted to engage a screw 12, which, as shown, is round-headed and has combined with it a washer 13. The fastener 14, that connects the sections 1 and 2, is of the same construction as that shown in Fig. 3 except that it is double,—that is to say, has locking-slots on both ends—and this will permit it to engage and secure two objects at one time that are disposed at right angles to each other.

The form of the invention shown in Fig. 4 is also adapted to be secured at the corner of an object which is only provided with a single locking-slot 15. It is also provided with an orifice 17 in addition to the orifices 8 and 10 to receive a screw for holding the two articles from accidental separation from each other.

The form of the invention shown in Fig. 5 is adapted more particularly for invisible work—that is to say, it is designed to be secured in a mortise or recess in the edge of an object and to engage with a locking device or locking devices in a mortise in an adjacent object. The fastener is provided with three orifices 18, through which screws or other form of fastening devices will be passed to secure it within the mortise. The locking-slots 19 are disposed on opposite sides of the fastener and converge toward one edge thereof. The fastener is further provided with an orifice 20 to receive the screw for securing it in position against accidental separation.

In the form of the invention shown in Fig. 6 the fastener 21 is provided with longitudinal entering-slots 22, that are disposed in alinement and from which project obliquely-disposed locking-slots 23, that are adapted to engage with screws 24, carried by the objects to be connected, a screw 25 serving to secure the fastener in position. In this case the object 26 will be the stationary one and the objects 27 and 28 will be the parts that will be secured to the part 26. Owing to the oblique disposition of the slots 23, it will be seen that when the fastener is turned in the direction to cause the walls of the slots to ride upon the screws 24 there will be a drawing action exerted upon the objects 27 and 28 which will cause them to bear firmly upon the object 26. When the desired adjustment has been secured, the screws 24 are tightened, and the fastener is thus held in position.

The form of the invention shown in Figs. 7 and 8 is adapted for connecting two objects by an invisible joint. Fig. 7 shows the blank from which the fastener is made prior to being bent and positioned as shown in Fig. 8. The fastener 29 is provided with longitudinally-alined slots 30 and with a central orifice 31 to receive a screw or the like to position the fastener upon an object. The fastener is bent longitudinally so as to cause its sides 32 to be oppositely inclined, as shown in Fig. 8, the degree of inclination of which will correspond to the angular disposition of the under side of a head of a screw 33, which is secured to one of the objects 34, the other object 35 being provided with a channel 36 to receive the fastener 29. It will be seen from this arrangement that when the screw 33 is in position it may readily be slipped between the sides 32 of the fastener, and thus operate positively to clamp the two objects together.

In the form of the invention shown in Fig. 9 the fastener is provided with a pair of locking-slots on one side, and this form of the invention is more particularly adapted for securing the side rails of a bed to the head and foot portions thereof.

While all the improvements herein defined are simple in character, they will be found efficient for the purpose designed and may readily be applied to articles of furniture or the like with a minimum of labor.

I claim—

1. A furniture-fastener comprising a plate provided with a locking-slot disposed obliquely to one end of the plate, with an entering-slot communicating with the locking-slot and disposed at right angles to one edge of the plate, and with orifices for receiving securing devices, one of which is open-ended.

2. A furniture-fastener comprising a bendable plate provided on opposite edges with pairs of obliquely-disposed locking-slots pitched in opposite directions, with an entering-slot intersecting the locking-slots, and with orifices to receive attaching devices, one of which is open-ended.

3. A furniture-fastener comprising a plate approximately V-shaped in cross-section and provided at its angle with locking-slots, and intermediate of its ends with an orifice to receive a fastening device.

In testimony that I claim the foregoing as my own I have hereto affixed my signature in the presence of two witnesses.

JOHN E. FAUGHT.

Witnesses:
WILLIAM F. McNAGUY,
P. H. CLUGSTON.